United States Patent [19]

Howard et al.

[11] Patent Number: 4,701,944
[45] Date of Patent: Oct. 20, 1987

[54] SIGNALLING SYSTEM FOR TRUNKED PRIVATE CALLS

[75] Inventors: Scott P. Howard, Buffalo Grove; Ted A. Kozlowski, Chicago; Michael H. Retzer, Palatine, all of Ill.

[73] Assignee: Motorola, Inc., Schaumburg, Ill.

[21] Appl. No.: 908,472

[22] Filed: Sep. 17, 1986

[51] Int. Cl.[4] .............................................. H04Q 7/01
[52] U.S. Cl. ........................................ 379/63; 379/57
[58] Field of Search .................... 379/57, 63, 288, 245, 379/246, 207, 220, 221; 455/38; 340/825.44; 370/18, 95, 80

[56] References Cited

U.S. PATENT DOCUMENTS

| | | | |
|---|---|---|---|
| 4,013,843 | 3/1977 | Lupattelli et al. | 379/221 |
| 4,188,508 | 2/1980 | Rogers et al. | 379/200 |
| 4,585,904 | 4/1986 | Mincone et al. | 379/200 |
| 4,639,723 | 1/1987 | Boughton | 340/799 |
| 4,642,632 | 2/1987 | Ohyagi et al. | 340/825.44 |
| 4,644,546 | 2/1987 | Doz et al. | 371/49 |
| 4,661,974 | 4/1987 | Bales et al. | 379/198 |

Primary Examiner—Robert Lev
Attorney, Agent, or Firm—Thomas G. Berry; Donald B. Southard

[57] ABSTRACT

Disclosed is a signalling system wherein a private call initiating trunked subscriber enters a private ID number on an entry means. The trunked subscriber unit decodes the entered number and forms the ID code required to request a channel. The central controller receives the request and encodes an appropriate channel grant for a trunked private call. In another aspect of the present invention, the called subscriber unit may decode and display the ID of the calling subscriber.

20 Claims, 8 Drawing Figures

100

100

| SIZE CODE | PREFIX LENGTH (BITS) | GROUP LENGTH (BITS) | SUB-GROUP LENGTH (BITS) | INDIVIDUAL LENGTH (BITS) |
|---|---|---|---|---|
| (0) A | 3 | 7 | 2 | 4 |
| (1) B | 3 | 4 | 3 | 6 |
| (2) C | 3 | 3 | 3 | 7 |
| (3) D | 3 | 0 | 4 | 9 |
| (4) E | 3 | 6 | 2 | 5 |
| (5) F | 3 | 5 | 3 | 5 |
| (6) G | 3 | 5 | 2 | 6 |
| (7) H | 3 | 4 | 2 | 7 |
| (8) I | 3 | 3 | 2 | 8 |
| (9) J | 3 | 2 | 3 | 8 |
| (10) K | 3 | 1 | 4 | 8 |
| (11) L | 2 | 0 | 5 | 9 |
| (12) M | 2 | 0 | 4 | 10 |
| (13) N | 1 | 0 | 5 | 10 |
| (14) O | 1 | 0 | 4 | 11 |
| (15) P | 0 | 0 | 5 | 11 |
| (16) Q | 0 | 0 | 4 | 12 |

| PRE-FIX (BINARY) | SIZE CODE |
|---|---|
| 000 | A(0) |
| 001 | B(1) |
| 010 | C(2) |
| 011 | D(3) |

SIGNALLING SYSTEM FOR TRUNKED PRIVATE CALLS

TECHNICAL FIELD

This invention relates generally to trunked communications systems and more particularly to a method and apparatus for coding and transmitting signalling information to communicate with another trunked system subscriber.

BACKGROUND ART

In a basic trunked system there exist a high degree of flexibility to partition voice conversations between different groups so that no one agency or district is aware that another agency or district is using the system. Typically, these groups are subdivided into subgroups and individuals so that call may be made using either a group, subgroup or individual ID code depending upon the type of communication desired by an initiating subscriber.

To establish a trunking voice communication between a group of units operating on a trunked system, it is known for a subscriber unit to send a data packet called a "inbound signalling word" (ISW). The ISW contains the requesting unit's unique ID code consisting of a group ID, an individual ID, and a subgroup code indicating which group of units are desired for communication. The request is forwarded to a central controller which decodes the request, and transmits a data packet called a "outbound signalling word" (OSW) to all subscriber units, which continuously monitor the control channel when not participating in a voice conversation. The OSW is a channel grant which contains the subgroup code of the requesting unit's ID code, and the voice channel number assigned for the conversation. The OSW causes the requesting unit to move to the voice channel and commence transmitting, while simultaneously causing all other subscriber units with a matching group ID to move to the voice channel as listening units. In this way a group call is set up. If, however, all voice channels are in use when a subscriber unit transmits an ISW, the central controller typically sends the requesting subscriber a "busy OSW".

In addition to group calls, it is often desirable for a subscriber to communicate privately with another subscriber. In prior trunked systems, individual or private communication was limited to a few preselected individuals. The call initiating subscriber selected one of the preselected few by a selection means such as a rotary switch or functional equivalent. Of course, a more desirable method of establishing a trunked private call may be envisioned by modelling the trunked communication system after the common telephone system. Thus, it would be desirable to merely enter a private ID number in a manner similar to dialing a telephone number to initiate a trunked private call. However, in practice, this improvement has been impossible to implement since the number of digital bits required to represent such a private ID number exceeds the maximum number of bits that the trunked system can communicate via the established signalling system. Accordingly, prior trunked radio communication systems suffer the detriment of having poor facilities to accommodate private subscriber calls.

SUMMARY OF THE INVENTION

Accordingly, it is an object of the present invention to provide an improved trunked communication system.

It is a further object of the present invention to provide improved private call capability within established signalling systems.

It is another object of the present invention to provide a trunked communication system having improved private call capabilities.

It is yet a further object of the present invention to provide a trunked communication system having improved intrafleet private call capabilities.

It is yet another object of the present invention to provide an improved trunked communication system having improved interfleet private call capabilities.

It is yet a further object of the present invention to provide a unique coding system to encode and decode trunking private call ID numbers.

Briefly, according to the invention, a private call initiating trunked subscriber enters a private ID number on an entry means. The trunked subscriber unit decodes the entered number and forms the ID code required to request a channel. The central controller receives the request and encodes an appropriate channel grant for a trunked private call. In another aspect of the present invention, the called subscriber unit may decode and display the ID of the calling subscriber.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like reference numerals identify like elements, and in which;

DETAILED DESCRIPTION OF THE PREFERRED EMBODIMENT

Figure 1:
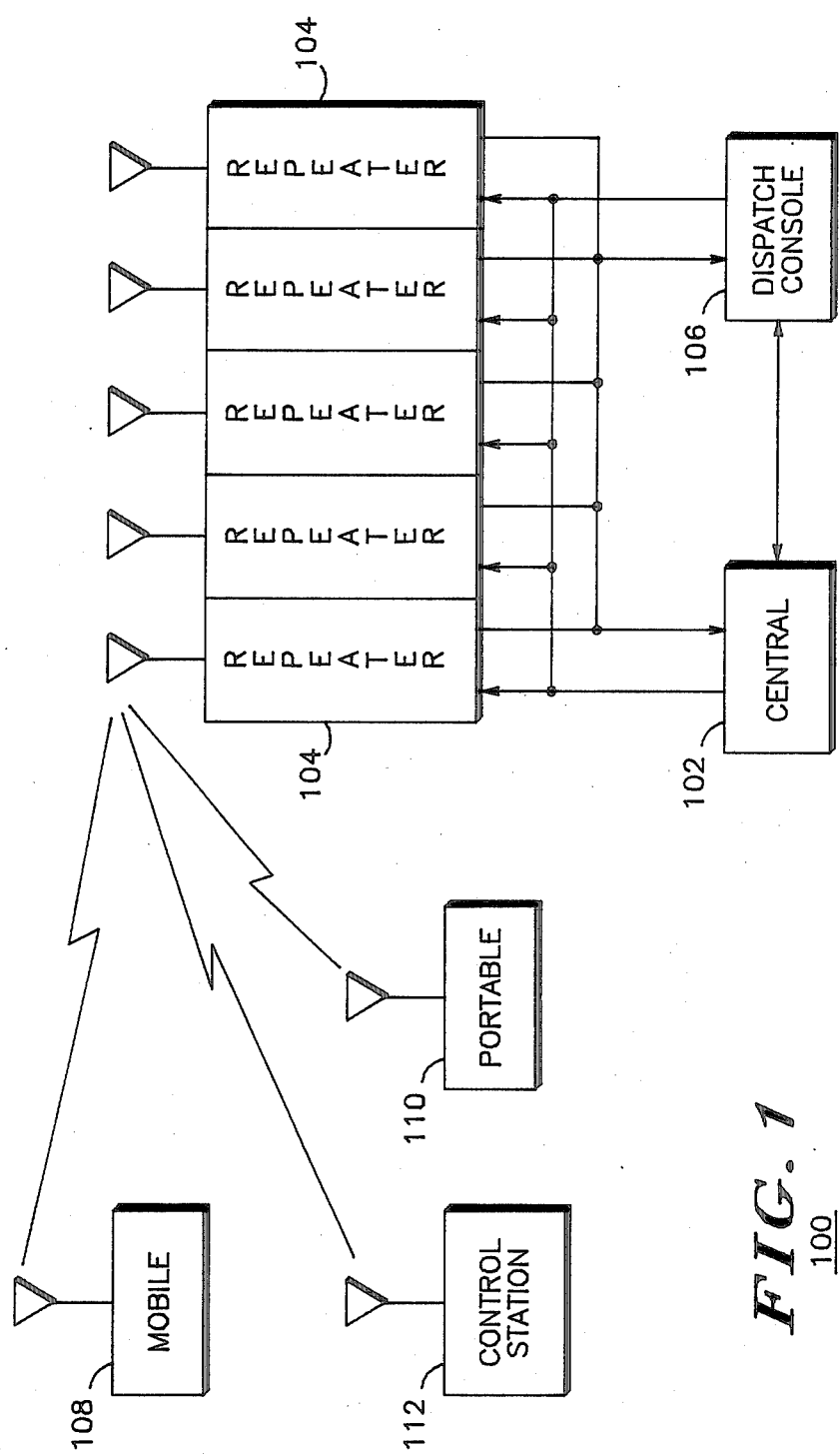
FIG. 1 is a exemplary block diagram of a trunking system suitable for using the present invention.

Referring now to the drawings and in particular to FIG. 1, there is shown a block diagram of a trunked communication system, which may employ the present invention. Basically, the trunked system is comprised of a central controller 102, a plurality of trunked repeaters 104, an optional dispatch console 106 and a plurality of subscriber units. A dispatch console (106) is generally viewed by the central 102 as a priority subscriber having expand capabilities such as, for example, audio takeover and respective control. The subscriber units communicating on this system may include mobile subscribers 108, portable subscribers 110 or control station subscribers 112. Typically, mobile units are understood to be transceivers designed to operate in a vehicle. A portable unit is typically understood to be a transceiving device designed primarily to be carried on or about the person. Control stations, are usually permanent or semi-permanent installations in buildings or other such fixed locations. These are collectively referred to herein as subscriber units which communicate with one another on a group, subgroup or individual basis through the central controller 102. Preferably, each of the trunked repeaters 104 is capable of acting as a voice channel or a control channel, which is used to receive channel requests and grant channels for voice messages. Alternately, a predetermined subset of the total number of trunked repeaters may act as the control channel, Typically, the particular repeater 104 that is used as the control channel is periodically changed to avoid overstressing a particular repeater since the control channel transceiver operates continuously.

As previously mentioned, prior trunked communication systems had rudimentary Private Call capabilities. These capabilities were generally limited to intragroup calls and commonly referred to as Private Call I. To use Private Call I, an initiating subscriber unit would select one of a preselected few individuals using a rotary switch or functional equivalent. An appropriate private call request ISW was then transmitted to the central, which returned an appropriate private call channel grant OSW to the initiating subscriber, and the selected individual. In addition to the limited Private Call I feature, some prior trunked communication systems had a corresponding Call Alert I option. The Call Alert option may be though of as a subset (or special case) of private call capabilities wherein individual subscribers are "paged" via the control channel without initiating a voice conversation. Thus, the Call Alert I feature would light an indicator or sound a horn to alert or page the called subscriber.

The present invention provides for both intragroup private calls and intergroup private calls. The latter is commonly referred to as Private Call II (and a corresponding Call Alert II) or, Unlimited Private Call. Provision is made by the present invention to also accommodate Private Call I type calls, thus providing a "backward compatible" signalling scheme.

Figures 2, 3, 7:
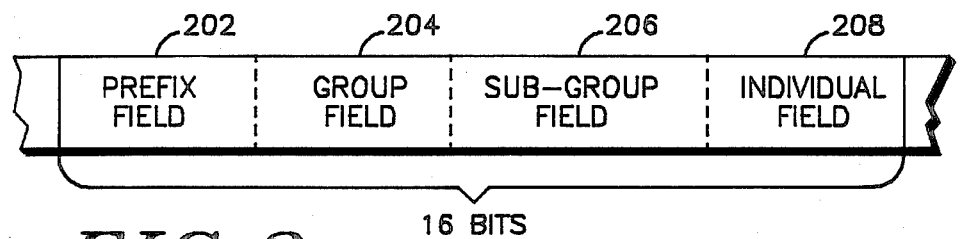
FIG. 2 is an illustration of the preferred sixteen bit ID code.
FIG. 3 is an exemplary size code table.
FIG. 7 is a prefix size code cross reference table.

Referring now to FIG. 2, the preferred format for the 16 bit ID code 200 is illustrated. The ID code 200 consists of a prefix field 202, a group field 204, a subgroup field 206 and an individual field 208. The actual size or length (in bits) of each of these fields varies depending upon a parameter known as the size code. Generally, a trunked communication system has several size codes that are assigned to a particular group or subgroup of subscriber units. A size code determines the number of bits allocated to each field, and hence, the number of subscribers per group, the number of subgroups each group may have, and how many individuals each group may contain. For example, if a particular system wished to have a large number of individual ID codes and a small number of subgroups, more bits would be allocated to the individual field 208 and fewer bits allocated to the subgroup field 206.

Referring now to FIG. 3, an exemplary size code table is illustrated. FIG. 3 sets out a typical size code map for 16 different size codes (A-Q). For example, size code A would have a prefix field (202) of 3 bits, a group field (204) of 7 bits, a subgroup field (206) length of 2 bits and an individual field (208) of 4 bits. Generally, the size code chart is stored in a memory means in each subscriber unit. Preferably, the subgroup length column is omitted from the memory since the subgroup field could easily be calculated by the equation:

$$\text{Sub-group} = 16 - \text{prefix} - \text{group} - \text{individual} \tag{1}$$

Therefore, the preferred method saves memory since one less column of information must be stored locally in each subscriber unit. Of course, any one of the four parameters may be omitted and calculated as required. Alternately, the entire table could be stored and the required parameters simply read out of the memory means.

Figure 4:
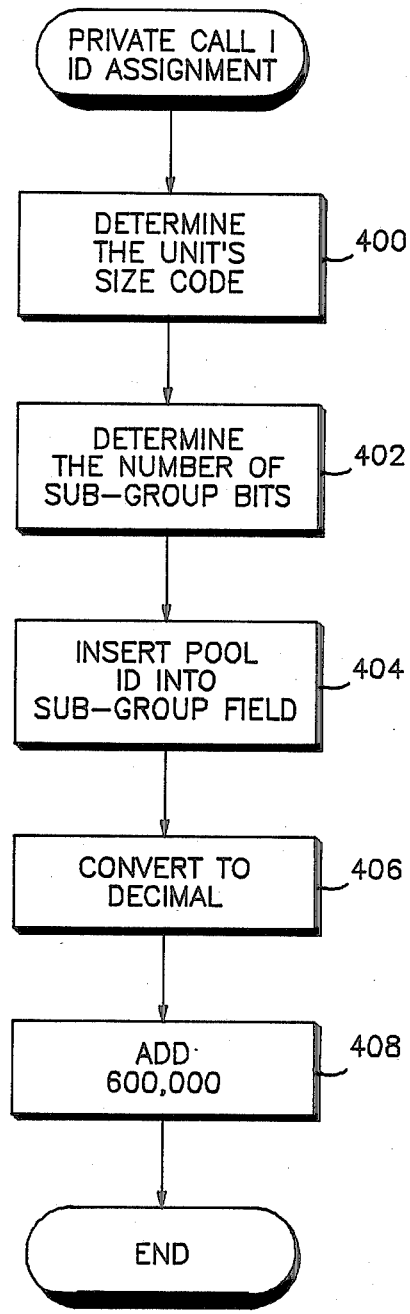
FIG. 4 is a flow diagram describing the steps required to assign a private call one ID code.

Referring now to FIG. 4, the steps used to assign an ID code to a subscriber to communicate via the Private Call I signalling is shown. In another aspect of the present invention, the called subscriber receives the 16 bit ID of the calling subscriber via the control channel and uses this routine to display the ID of the calling subscriber. The routine begins in step 400 which determines the unit size code. Once the size code is known, step 402 determines the number of bits in the subgroup field either by equation (1) or by reading it out of the size code chart such as that illustrated in FIG. 3. In place of the subgroup field, the supervisor pool ID is inserted. The supervisor pool ID is a predetermined ID code depending upon the supervisor of the operational group of the individual subscriber. The supervisor pool ID is preferably stored locally in each subscriber unit. Step 406 converts the modified 16 bit binary number into a decimal number, and step 408 adds 600,000 to the decimal number. The purpose of this, is to place a leading decimal 6 on the ID code. The decimal number provided by step 406 will be 5 bits in length assuming standard binary-two decimal conversion. Thus, a "leading six" is provided to designate Private Call I encoding for the transmitting subscriber unit, since a Private Call II type call will always have a leading decimal digit of 5 or less. Alternately, 600,000 (in binary) could be added to the 16 bit binary number provided by step 404 and the result converted to decimal 406. Either technique is suitable for use in the present invention, however, the one illustrated in FIG. 4 is preferred.

As an example, and not as a limitation, a Private Call I ID assignment may be made as follows. Assume that:
Size Code=C
Prefix=4
Group ID=5
Individual ID=1
Supervisory Pool ID=1.

For size code C, the following fields exist (see FIG. 3):
Prefix Field Length=3 bits
Group ID Length=3 bits
Subfleet ID Field=3 bits
Individual ID Field=7 bits.

Therefore, the 16 bit ID would be as follows:

100|101|xxx|0000001
 P   G  S-G   IND where:
P is the Prefix field
G is the Group field S-G is the Sub-Group field IND is the individual field.

The Supervisory Pool ID is inserted in place of the subgroup field (see step 404 of FIG. 4) to render the following:

100|101|001|0000001
P   G   Pid   IND

Where:

Pid is the Pool ID field

This number is converted to decimal and would be 38017. Step 408 adds 600,000 therefore the Private Call I ID is 638017.

Figure 5:
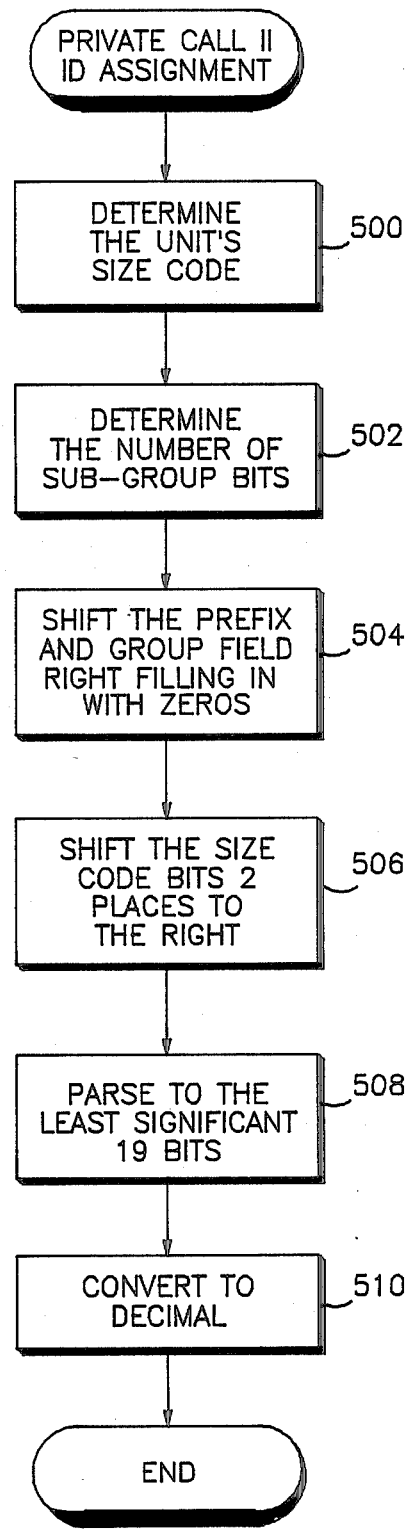
FIG. 5 is a flow diagram describing the steps required to assign a private call two ID code.

Referring to FIG. 5, the preferred method for Private Call II (and accordingly Call Alert II) ID assignments are shown. As with FIG. 4, these steps may be executed by the called subscriber to encode and display the ID of the calling subscriber on an appropriate display means. This feature is particularly useful when used in conjunction with a Call Alert (I or II) type call. In step 500, the unit size code is determined. Step 502 determines the number of subgroup bits available via either equation 1 or direct readout if the subgroup field is stored. Step 504 shifts the Prefix and Group Fields right by the number of bits calculated in step 502 (subgroup length) filling in with zeroes from the left. Step 506 shifts the size code bits two places to the right. Step 508 parses the binary number provided by 506 to the least significant 19 bits. This number is converted to decimal in step 510 which provides the Private Call II ID number.

As an example, and not as limitation, of a Private Call II ID assignment consider the following.

Size Code=F.

Prefix=4

Group ID=26

Individual ID=27.

From equation 1 (or FIG. 3), the subgroup field length is 3 bits. Therefore, in binary, the above information may be represented as follows:

00000101|100|11010|xxx|11011
SC        P    G    S-G  IND

Where:

SC is the size code

P is the Prefix field

G is the Group field

S-G is the Sub-Group field

IND is the Individual field.

According to step 502, the prefix and group bits are shifted 3 bits to the right filling in with zeroes, Accordingly, the binary number may now be represented as follows:

00000101|000|100|11010|11011
SC        Z   P    G    IND

Where:

Z are the filled in zeros

The size code bits are shifted two bits to the right to provide the following:

xx|00000101|0|100|11010|11011
   SC       Z  P   G    IND

The bits are then parsed to the least significant 19 bits which provides:

00101|0|100|11010|11011
SC    Z  P    G    IND

Lastly, this number is converted to decimal to provide the 6 digit Private call II ID, which is 086873 (note that the leading digit is always 5 or less to designate a Private Call II ID from a Private Call I ID.)

The ID code assignments of FIGS. 4 and 5 are generally programmed at the factory, or alternately, in the field or an authorized service center. However, the subscriber unit that transmits the requesting ISW to the central must operate "backwards". That is, the operator enters the six digit ID number and the subscriber unit must decode this number and transmit an appropriate ID packet with the requesting ISW.

Figure 6:
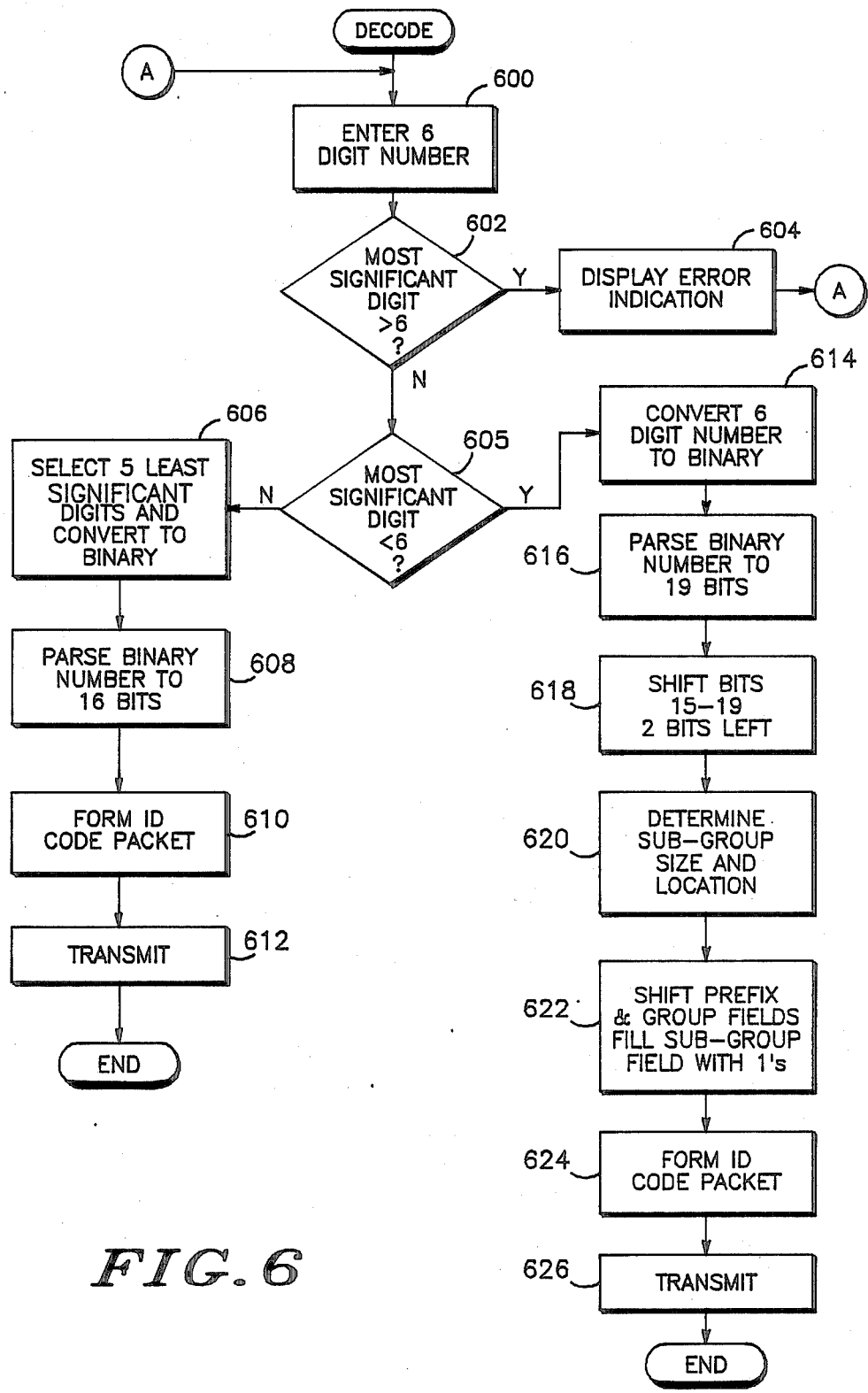
FIG. 6 is a flow diagram of the steps executed by a trunked subscriber unit in accordance with the present invention.

Referring now to FIG. 6, the steps executed by an initiating subscriber unit in accordance with the present invention are illustrated. In step 600, the initiating operator enters a six digit ID number either from a numeric keypad, a menu selection means or other suitable entry device. Decision 602 determines whether the most significant digit (MSD) is greater than six. If the determination of decision 602 is that the MSD is greater than six, step 604 displays an error indication since the only valid ID numbers either begin with 6 (for Private Call I) or a number less than 6 (for Private Call II). Assuming now that the determination of decision 602 is that the most significant digit is less than or equal to 6, decision 604 determines whether the most significant digit is less than 6 (to determine which private call type is being requested). If the determination of decision 604 is that the most significant digit is not less than 6 (i.e., it must be equal to 6), the routine proceeds to step 606. In step 606, the least significant five digits are selected and converted to binary. In step 608, the now binary number is parsed to the least signifiant 16 bits. These 16 bits are formed into an ID code packet in step 610, which is transmitted in step 612 along with any other signalling information that may be required by any particular implementation.

Assuming now that the determination of step 604 was that the most significant digit was less than 6, the routine proceeds to step 614. In step 614, the 6 digit decimal number is converted to binary. This binary number is parsed to the least significant 19 bits in step 616. In step 618, bits 15–19 are shifted 2 bits to the left. In step 620, the subgroup field size and location are determined using the size code table. The prefix and group fields are shifted to the left by the number of bits of the subgroup length and the subgroup field is filled with binary ones in step 622. Step 624 forms an ID packet from the least significant 16 bits, which is transmitted in step 626 along with any other information required by a particular implementation.

As an example, and not as a limitation, of the decoding procedure for a Private Call I call assume that the operator has entered the Private Call I ID of 638017. Step 606 selects the least significant 5 digits and converts to binary to render the following:

1000|1000|1000|0001

The binary number is parsed to the least significant 16 bits (in this example, the number is normally represented in 16 bits) to yield:

1000100010000001

These 16 bits form the ID code (see FIG. 2) that is transmitted in step 612 for a Private Call I ISW.

As an example, and not as a limitation of a Private Call II decoding procedure, assume that the Private Call II ID of 086875 is entered. In step 614, the ID code is converted to binary to yield:

0000|0001|0101|0011|0101|1011

This binary number is parsed to 19 bits in step 616 to provide:

00101|01001101011011
19-15

Bits 15-19 are shifted 2 bits to the left in step 618 to provide:

101xx|01001101011011

The first three (3) bits (here 101=5=F) are used to determine the size code, which is used to determine the subgroup length (see FIG. 3 or equation 1) and location. The prefix and group fields are then shifted to the left to open the sub-group field. This results in:

101|100|11010|xxx|11011
SC  P   G    S-G  IND

The sub-group field is filled with binary ones to yield the following:

101|100|11010|111|11011
SC  P   G    S-G  IND

The least significant 16 bits are then parsed to yield:

100|11010|111|11011
P    G   S-G  IND

This forms the ID code to be transmitted with the ISW (see FIG. 2).

Referring now to FIG. 7, an exemplary prefix/size code cross reference table is shown. For the central to properly encode a channel grant OSW, it must determine the size code of the called subscriber. For Private Call I (intragroup only), this is not a problem since each subscriber within a group must have the same size code. However, for Private Call II, the size code of the called party must be determined. Since this information is not transmitted in the 16 bit ID field (see FIG. 2) it must be cross referenced within the central in the prefix/size code cross reference table. FIG. 7 illustrates an exemplary prefix/size code table for a trunked communication system having 4 size codes. Those skilled in the art will appreciate that a particular trunked system may have any number of the 16 possible size codes illustrated in FIG. 3 and moreover, the selected size codes may be random in nature (i.e., size codes a, b, f and q).

Figure 8:
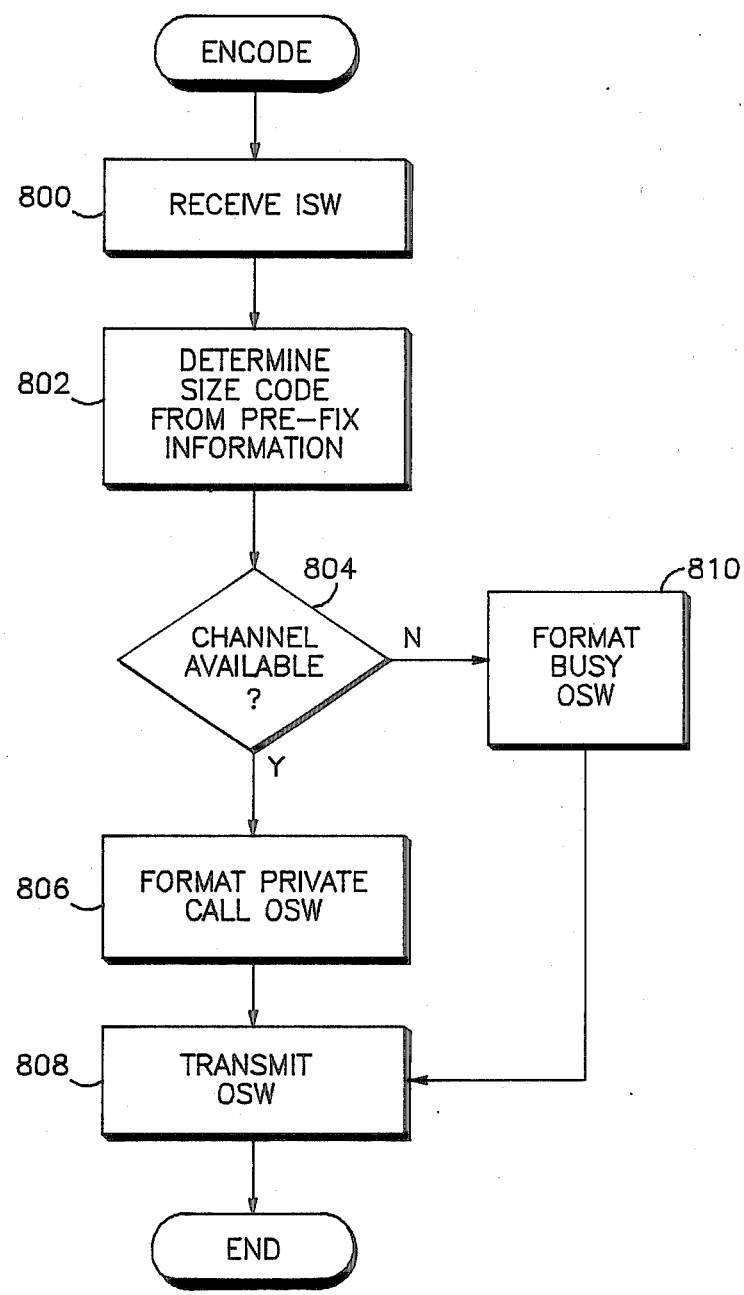
FIG. 8 is a flow diagram of the steps executed by the central controller in accordance with the present invention.

Referring now to FIG. 8, the steps executed by the central controller according to the present invention are shown. In step 800, the transmitted ISW is received by the central controller. Step 802 examines the most significant 3 bits to determine the prefix. These 3 bits are used in conjunction with the prefix/size code cross reference table to determine the size code of the called subscriber.

Once the size code is determined in step 802, the routine proceeds to decision 804, which determines whether a channel is available. If a channel is available, the central controller formats a Private Call OSW in step 806, which will be transmitted via the control channel to the requesting subscriber and the called subscriber in step 808. However, if the determination of decision 804 is that no channels are available, the central will format a busy OSW in step 810 which will be transmitted via the controlled channel in step 808.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. In a trunked communication system having a plurality of subscriber units and at least one central station, a method for any one subscriber to request a private call, comprising the steps of:
   (a) entering an ID number corresponding to another subscriber unit;
   (b) parsing said ID number to a predetermined number of digits;
   (c) converting said parsed ID number to a binary number;
   (d) parsing said binary number to predetermined number of bits;
   (e) transmitting at least said parsed binary number to the central station.

2. The method of claim 1, wherein the step of entering is performed via a keypad.

3. The method of claim 1, wherein the step of entering is performed via a menu-driven display means.

4. The method of claim 1, wherein the step of entering comprises entering a six digit ID number.

5. The method of claim 1, wherein the steps of parsing and converting are reversed.

6. The method of claim 1, wherein step (b) comprises parsing said entered number to five digits.

7. The method of claim 1, wherein step (d) comprises parsing said binary number to sixteen bits.

8. In a trunked communication system having a plurality of subscriber units and at least one central station, a method for any one subscriber to request a private call, comprising the steps of:
   (a) entering an ID number corresponding to another subscriber unit;
   (b) converting said ID number to a binary number;
   (c) parsing said binary number to a predetermined number of bits;
   (d) shifting selected bits within said parsed binary number;
   (e) inserting predetermined binary bits in place of selected bits within said shifted binary number;
   (f) parsing said binary number to form an ID code having a predetermined length;
   (g) transmitting at least said ID code to the central controller.

9. The method of claim 8, wherein the step of entering is performed via a keypad.

10. The method of claim 8, wherein the step of entering is performed via a menu-driven display means.

11. The method of claim 8, wherein step (c) comprises parsing said binary number to nineteen bits.

12. The method of claim 8, wherein the step of shifting comprises shifting bits 15-19 two bits to the left.

13. The method of claim 8, wherein the step of inserting comprises inserting binary 1's into at least a portion of said binary number.

14. The method of claim 8, wherein step (f) comprises parsing said binary number to sixteen bits.

15. In a trunked communication system having a plurality of subscriber units and at least one central station, a method for any one subscriber to request a private call, comprising the steps of:
(a) entering a six digit decimal ID number corresponding to another subscriber unit;
(b) parsing said ID number to a five digit number;
(c) converting said parsed number to a binary number;
(d) parsing said binary number to a sixteen bit ID code;
(e) transmitting at least said ID code to the central station.

16. In a trunked communication system having a plurality of subscriber units and at least one central station, a method for any one subscriber to request a private call, comprising the steps of:
(a) entering a six digit decimal ID number corresponding to an another subscriber unit;
(b) converting said entered number to a binary number;
(c) parsing said binary number to a nineteen bit binary number;
(d) shifting at least bits 15-19 of said parsed binary number two bits to the left;
(e) inserting binary 1's into a predetermined portion of said shifted binary number;
(f) parsing the binary number provided by step
(e) to provide a sixteen bit ID code;
(g) transmitting at least said ID code to the central controller.

17. In a trunked communication system having a plurality of subscriber units and at least one central station, a method for any one subscriber to request a private call, comprising the steps of:
at any of the subscriber units:
(a) entering an ID number corresponding to another subscriber unit;
(b) parsing said ID number to a predetermined number of digits;
(c) converting said parsed ID number to a binary number;
(d) parsing said binary number to predetermined number of bits;
(e) transmitting at least said parsed binary number to the central station;
at the central controller:
(f) receiving the information transmitted from the requesting subscriber;
(g) determining whether a channel is available;
(h) transmitting either a channel grant or a busy information packet in response to step (g).

18. In a trunked communication system having a plurality of subscriber units and at least one central station, a method for any one subscriber to request a private call, comprising the steps of:
at any of the subscriber units:
(a) entering an ID number corresponding to another subscriber unit;
(b) converting said ID number to a binary number;
(c) parsing said binary number to a predetermined number of digits;
(d) shifting selected bits within said binary number;
(e) inserting predetermined binary bits in place of selected bits within said binary number;
(f) parsing said binary number to predetermined number of bits;
(g) transmitting at least said parsed binary number to the central station;
at the central controller;
(h) receiving the information transmitted from the requesting subscriber;
(i) determining the size code of the called subscriber;
(j) determining whether a channel is available;
(k) transmitting either a channel grant or a busy information packet in response to step (j).

19. In a trunked communication system having a plurality of subscriber units and at least one central station, a subscriber unit capable of requesting private calls, comprising:
means for entering an ID number corresponding to another subscriber unit;
means for parsing said ID number to a predetermined number of digits;
means for converting said parsed ID number to a binary number;
means for parsing said binary number to predetermined number of bits;
means for transmitting at least said parsed binary number to the central station.

20. In a trunked communication system having a plurality of subscriber units and at least one central station, a subscriber unit capable of requesting private calls, comprising:
means for entering an ID number corresponding to another subscriber unit;
means for converting said entered number to a binary number;
means for parsing said binary number to a predetermined number of bits;
means for shifting selected bits within said binary number;
means for inserting predetermined binary bits in place of selected bits within said binary number;
means for parsing said binary number to form an ID code having a predetermined length;
means for transmitting at least said ID code to the central controller.

* * * * *